United States Patent
Choi et al.

(10) Patent No.: US 12,120,081 B2
(45) Date of Patent: Oct. 15, 2024

(54) METHOD FOR PROCESSING INTEREST MESSAGE AND APPARATUS FOR IMPLEMENTING THE SAME

(71) Applicant: SAMSUNG SDS CO., LTD., Seoul (KR)

(72) Inventors: Myoung Kyhun Choi, Seoul (KR); Seung Jin Kim, Seoul (KR); Seung Won Lee, Seoul (KR); Do Hyeong Kim, Seoul (KR); Jong Seong Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/216,132

(22) Filed: Jun. 29, 2023

(65) Prior Publication Data
US 2024/0098054 A1    Mar. 21, 2024

(30) Foreign Application Priority Data

Sep. 20, 2022 (KR) .......................... 10-2022-0118698

(51) Int. Cl.
*H04L 51/214* (2022.01)
(52) U.S. Cl.
CPC .................................. *H04L 51/214* (2022.05)
(58) Field of Classification Search
CPC ..... H04L 51/58; H04L 51/046; H04L 51/212; H04L 67/535; H04L 51/52; H04L 51/04; H04L 67/306; G06Q 50/01; G06Q 10/107; H04W 4/12
See application file for complete search history.

(56) References Cited

U.S. PATENT DOCUMENTS

| | | | | |
|---|---|---|---|---|
| 6,367,080 B1 * | 4/2002 | Enomoto | ........... | H04N 7/17318 |
| | | | | 348/E7.071 |
| 7,424,682 B1 * | 9/2008 | Pupius | ................. | H04L 51/04 |
| | | | | 709/206 |
| 8,214,380 B1 * | 7/2012 | Bettinger | ............ | G06F 16/9535 |
| | | | | 707/758 |

(Continued)

FOREIGN PATENT DOCUMENTS

| KR | 10-2015-0070476 A | 6/2015 |
|---|---|---|
| KR | 10-2016-0132709 A | 11/2016 |

(Continued)

OTHER PUBLICATIONS

Communication issued Jan. 22, 2024 by European Patent Office in corresponding European Application No. 23182155.4.

*Primary Examiner* — Ninos Donabed
(74) *Attorney, Agent, or Firm* — Sughrue Mion, PLLC

(57) ABSTRACT

Provided is a method performed in a terminal for processing an interest message. The method includes receiving a message from a message server after a login event for a user of the terminal occurs, wherein the login event is related to a message service provided by the message server; storing, in response to determining that the received message corresponds to an interest message of the user, the received message in a local storage of the terminal; receiving a search request for the interest message of the user; and searching and providing the interest message of the user through the local storage of the terminal in response to the search request.

8 Claims, 11 Drawing Sheets

(56) References Cited

U.S. PATENT DOCUMENTS

| | | | | |
|---|---|---|---|---|
| 8,290,940 | B2* | 10/2012 | Tysowski | H04W 4/12 707/722 |
| 9,106,447 | B2* | 8/2015 | Lee | G06F 16/48 |
| 9,515,920 | B2* | 12/2016 | Zhang | H04L 67/51 |
| 9,756,091 | B1* | 9/2017 | Davies | H04L 65/1089 |
| 10,735,352 | B2 | 8/2020 | Saito | |
| 2003/0055711 | A1* | 3/2003 | Doherty | G06Q 30/02 705/7.33 |
| 2003/0097361 | A1* | 5/2003 | Huang | G06Q 10/109 |
| 2005/0050047 | A1* | 3/2005 | Laronne | G11B 27/11 707/999.009 |
| 2005/0125547 | A1* | 6/2005 | Ahonen | H04M 1/72445 709/228 |
| 2006/0129636 | A1* | 6/2006 | Matsuura | G06F 16/9537 707/E17.11 |
| 2007/0226352 | A1* | 9/2007 | Nishio | H04L 67/51 709/227 |
| 2008/0189367 | A1* | 8/2008 | Okumura | H04L 67/306 709/204 |
| 2009/0207694 | A1* | 8/2009 | Guigne | G01S 5/22 367/127 |
| 2009/0265251 | A1* | 10/2009 | Dunlap | G06Q 10/087 707/999.005 |
| 2009/0315710 | A1* | 12/2009 | Richter | B60R 21/01532 340/540 |
| 2010/0088552 | A1* | 4/2010 | Kim | G06F 11/3495 714/E11.202 |
| 2010/0169841 | A1* | 7/2010 | Singh | G06F 3/04883 345/173 |
| 2010/0223272 | A1* | 9/2010 | Beckley | G06F 16/9038 707/E17.014 |
| 2011/0081922 | A1* | 4/2011 | Chandra | H04W 4/21 455/457 |
| 2011/0280214 | A1* | 11/2011 | Lee | H04L 67/63 370/331 |
| 2011/0283341 | A1* | 11/2011 | Palekar | H04L 63/0884 726/4 |
| 2012/0084348 | A1* | 4/2012 | Lee | G06Q 30/0261 709/203 |
| 2012/0089681 | A1* | 4/2012 | Chowdhury | H04L 67/55 709/206 |
| 2012/0102130 | A1* | 4/2012 | Guyot | H04L 51/212 709/206 |
| 2012/0102326 | A1* | 4/2012 | Palekar | G06F 21/6218 713/168 |
| 2013/0138455 | A1* | 5/2013 | Saharan | G16H 70/60 705/2 |
| 2014/0164524 | A1* | 6/2014 | Chung | G06F 16/90335 709/206 |
| 2014/0325391 | A1* | 10/2014 | Zhang | H04L 51/04 715/753 |
| 2014/0359407 | A1* | 12/2014 | Demsey | G06F 16/94 715/205 |
| 2015/0220995 | A1* | 8/2015 | Guyot | G06Q 30/0269 705/14.66 |
| 2016/0092960 | A1* | 3/2016 | Deshpande | G06Q 30/0625 705/26.62 |
| 2016/0212148 | A1* | 7/2016 | Uzun | H04L 63/123 |
| 2016/0330160 | A1* | 11/2016 | Shan | H04L 51/52 |
| 2017/0060966 | A1* | 3/2017 | Glover | G06F 16/252 |
| 2017/0251057 | A1* | 8/2017 | Sato | H04L 67/63 |
| 2018/0039691 | A1* | 2/2018 | Hazra | G06Q 10/10 |
| 2018/0069791 | A1* | 3/2018 | Dong | H04L 45/745 |
| 2018/0121499 | A1* | 5/2018 | Joshi | G06F 16/24578 |
| 2018/0331996 | A1* | 11/2018 | Zhang | H04L 51/04 |
| 2019/0073393 | A1* | 3/2019 | Mansour | H04L 51/04 |
| 2019/0141021 | A1* | 5/2019 | Isaacson | G06Q 30/0635 |
| 2019/0163664 | A1* | 5/2019 | Karani | G06F 15/17331 |
| 2019/0281030 | A1* | 9/2019 | Isaacson | H04L 63/0838 |
| 2021/0174426 | A1* | 6/2021 | Isaacson | H04W 12/37 |
| 2021/0248688 | A1* | 8/2021 | Schutt | G06Q 50/26 |
| 2021/0358023 | A1* | 11/2021 | Melcher | G06Q 50/01 |
| 2022/0108024 | A1* | 4/2022 | Hamdi | H04L 63/1483 |
| 2022/0109645 | A1* | 4/2022 | Delp | G06F 3/0482 |
| 2023/0100140 | A1* | 3/2023 | Ko | H04L 51/04 704/9 |

FOREIGN PATENT DOCUMENTS

| | | |
|---|---|---|
| KR | 10-1898546 B1 | 9/2018 |
| KR | 10-2054728 B1 | 12/2019 |

\* cited by examiner

METHOD FOR PROCESSING INTEREST MESSAGE AND APPARATUS FOR IMPLEMENTING THE SAME

CROSS-REFERENCE TO RELATED APPLICATION

This application claims priority from Korean Patent Application No. 10-2022-0118698, filed on Sep. 20, 2022, in the Korean Intellectual Property Office, the disclosure of which is incorporated herein by reference in its entirety.

BACKGROUND

1. Field

The present disclosure relates to a method for processing an interest message and apparatuses implementing the same, and more particularly, to a method for processing an interest message of a user using a message service (e.g., a message mentioning the user himself), and terminals and message servers implementing the method.

2. Description of the Related Art

Recently, a message service such as a chat service provides a user mention function as a means for attracting a specific user's attention or emphasizing and transmitting a specific message. Since the user mention function is implemented to transmit a notification even to a user whose message service notification function is turned off, it is usefully used when transmitting an urgent message or urging a response to a message.

Meanwhile, in order to provide a search function for messages, in which the user is mentioned, the search function should generally be implemented on the message server side. That is, the message server should classify and store mention messages for each user, and search and provide a mention message of a specific user according to a search request. However, this implementation method has a problem in that the load of the message server increases exponentially as the number of users using the message service increases.

SUMMARY

The technical problem to be solved through some embodiments of the present disclosure is to provide an interest message processing method that can reduce the load of a message server in providing a search function for an interest message, a terminal and a message server implementing the method.

Another technical problem to be solved through some embodiments of the present disclosure is to provide an interest message processing method that can prevent omission of a search result in providing a search function for an interest message, and a terminal and a message server implementing the method.

The technical problems of the present disclosure are not limited to the above-mentioned technical problems, and other technical problems not mentioned will be clearly understood by those skilled in the art from the description below.

According to some embodiments of the present disclosure, an interest message of a user may be stored in a local storage provided in a terminal of the user, and the interest message may be searched through the user's terminal instead of a message server. Accordingly, an accurate search function for an interest message can be implemented without increasing the load of the message server.

In addition, when there is no pre-stored interest message in the local storage of the terminal (e.g., when the user logs in to the message service for the first time through the terminal), the interest message of the corresponding user is searched through the message server, and the searched interest messages may be stored in the user's local storage. Accordingly, the problem of omission in the search result even if the search function for the interest message is implemented through the terminal can be prevented in advance. For example, a problem, in which interest messages occurred before the login of the user are omitted from search results, can be prevented in advance.

Effects according to the technical spirit of the present disclosure are not limited to the effects mentioned above, and other effects not mentioned will be clearly understood by those skilled in the art from the description below.

According to an aspect of the inventive concept, there is provided a method performed in a terminal for processing an interest message. The method may include receiving a message from a message server after a login event for a user of the terminal occurs, wherein the login event is related to a message service provided by the message server, storing, in response to determining that the received message corresponds to an interest message of the user, the received message in a local storage of the terminal, receiving a search request for the interest message of the user and searching and providing the interest message of the user through the local storage of the terminal in response to the search request.

In some embodiments, the interest message may include at least one of: a first message, in which the user is mentioned; a second message included in a thread of the first message; or a response messages to a message written by the user.

In some embodiments, the interest message may include a message related to a user of interest or a keyword of interest.

In some embodiments, the method may further include detecting occurrence of the login event, searching, in response to the detecting, interest messages of the user occurred before the login event through the message server and storing the searched interest messages in the local storage of the terminal.

In some embodiments, searching the interest messages of the user may include determining, in response to the detecting, whether a pre-stored interest message exists in the local storage and searching the interest messages of the user only when it is determined that the pre-stored interest message does not exist.

In some embodiments, after the login event, searching the interest messages of the user may not be performed if a login event for the user occurs again in the terminal.

In some embodiments, the method may further include receiving a plurality of unread messages from the message server and storing at least one message corresponding to the interest message of the user among the plurality of unread messages in the local storage.

In some embodiments, the method may further include displaying contents of a first message among the at least one message in a preview region located on a screen of the terminal, wherein a state of the first message is not changed to a confirmed state even if the contents of the first message is displayed in the preview region.

In some embodiments, contents of a second message related to the first message among the plurality of unread messages may further be displayed in the preview region, wherein the second message does not correspond to the interest message of the user.

According to another aspect of inventive concept, there is provided a terminal including one or more processors, a memory configured to store one or more instructions, a local storage and a communication interface configured to communicate with a message server wherein the one or more processors execute the stored one or more instructions to perform: receiving a message from the message server after a login event for a user of the terminal occurs, wherein the login event is related to a message service provided by the message server, storing, in response to determining that the received message corresponds to an interest message of the user, the received message in the local storage, receiving a search request for the interest message of the user and searching and providing the interest message of the user through the local storage in response to the search request.

According to still another aspect of inventive concept, there is provided a non-transitory computer-readable recording medium storing computer program executable by at least one processor to perform: receiving a message from a message server after a login event for a user of the terminal occurs, wherein the login event is related to a message service provided by the message server, storing, in response to determining that the received message corresponds to an interest message of the user, the received message in a local storage of the terminal, receiving a search request for the interest message of the user and searching and providing the interest message of the user through the local storage of the terminal in response to the search request.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
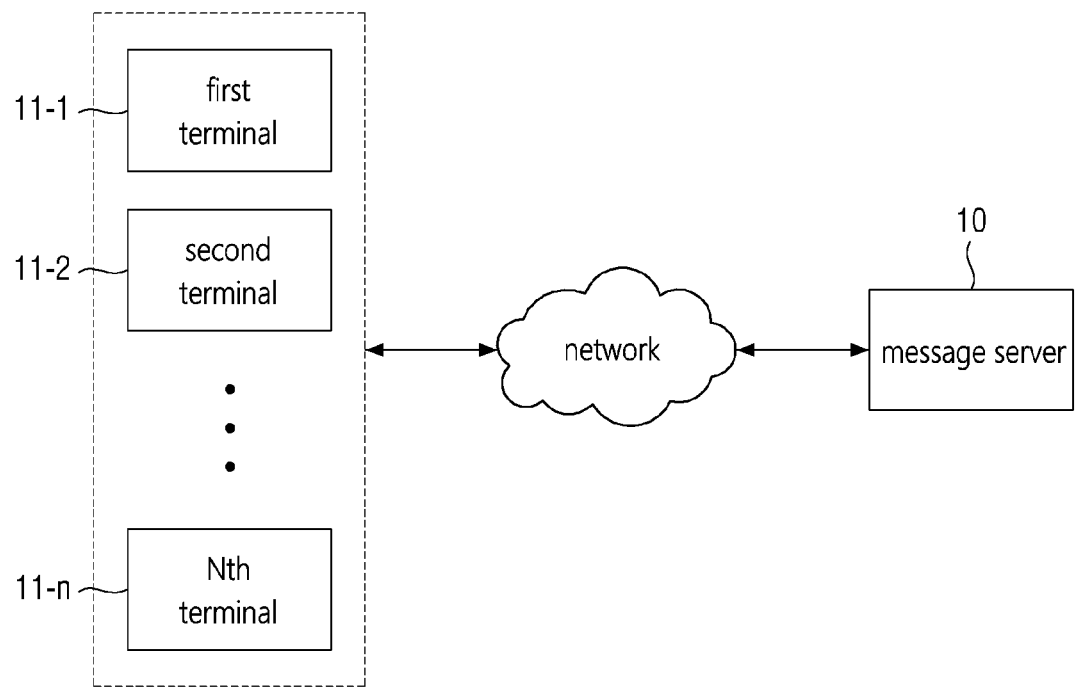
FIG. 1 is an exemplary diagram for describing a message service providing environment according to some embodiments of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

FIG. 1 is an exemplary diagram for describing a message service providing environment according to some embodiments of the present disclosure.

As shown in FIG. 1, in a message service providing environment according to embodiments, a message server 10 providing a message service and a plurality of terminals 11-1 to 11-n using the message service may exist. Hereinafter, for convenience of description, reference numeral '11' is used to refer to any terminal (11-1 or 11-2 or ... or 11-n) or collectively all terminals (11-1 to 11-n).

The message server 10 may refer to a computing device/system providing a message service. Here, the message service may include all kinds of services, in which communication between users is based on a message, such as a chat (or messenger) service, text message service, bulletin board service, e-mail service, and the like. Also, the message may include not only instant messages but also non-instant messages.

The message server 10 may provide a user management function (e.g., account management, ID/password management, login/logout processing, etc.), message relay function for message service. For example, the message server 10 may receive a message sending request from a first terminal 11-1 (e.g., sender terminal) and transmit the requested message to a second terminal 11-2 (e.g., receiver terminal).

In addition, the message server 10 may provide a processing function for interest messages of users. For example, the message server 10 may classify and store interest messages of users by user or type, or provide notifications (e.g., push notifications, etc.) on the interest messages.

The interest message may mean a message to attract the attention of a specific user or a message, in which a specific user is interested, and various types of messages may be set as interest messages by the user and/or the manager of the message server 10.

For example, a message related to the user himself (hereinafter, referred to as a 'my message') may be set as an interest message. My message can be, for example, a message, in which the user is mentioned (e.g., if the user is mentioned in a message or a comment/reply to that message), a thread of that message (e.g., a comment, a reply), or a reply message (e.g., a comment, a reply) to a message the user wrote (e.g., a post, a comment, a reply), but is not limited thereto.

As another example, a message related to a user of interest (i.e., a user of interest among other users other than the user) may be set as an interest message. An example of such a message may be, but is not limited to, a message, in which a user of interest is mentioned, a thread of the message, a message (e.g., a post, a comment/reply) written by the user of interest, and the like.

As another example, a message related to an interest keyword may be set as an interest message. An example of such a message may include, but is not limited to, a message including a keyword of interest in the contents of the message.

As another example, a message related to an interest group (e.g., department, etc.), an interest project, an interest topic, or an interest period may be set as an interest message.

As another example, an interest message may be set based on a combination of various examples described above. For example, among messages occurred during a specific period, a message, in which a writer (sender) is a specific user and a specific keyword is included in the contents of the message, may be set as an interest message.

The function and detailed operation of the message server 10 will be described in more detail later with reference to the drawings below in FIG. 2.

The message server 10 may be implemented with at least one computing device. For example, all functions of the message server 10 may be implemented in one computing device, or a first function of the message server 10 may be implemented in a first computing device and a second function may be implemented in a second computing device. Alternatively, a specific function of the message server 10 may be implemented in a plurality of computing devices.

Figure 11:
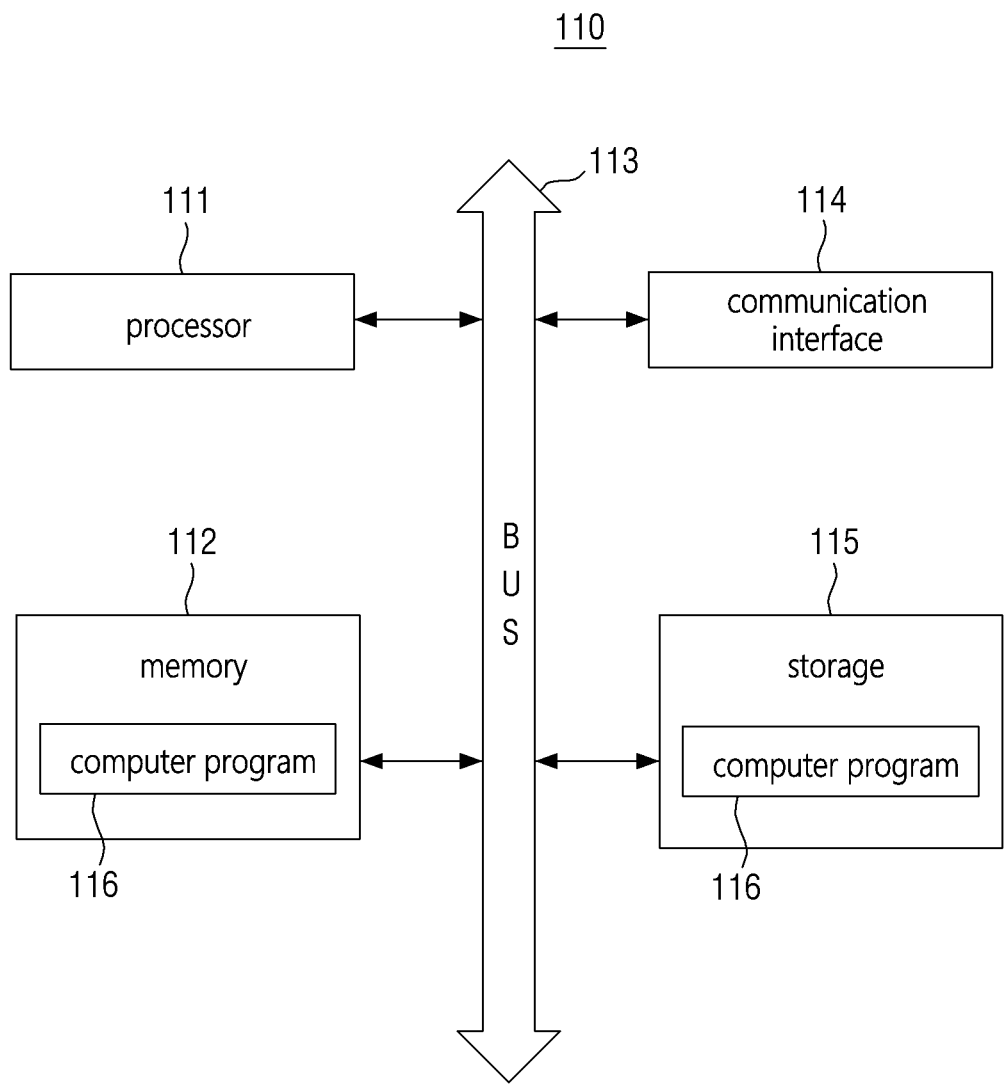
FIG. 11 illustrates an exemplary computing device that may implement a terminal and/or message server in accordance with some embodiments of the present disclosure.

A computing device may include any device having computing and communication functions, and an example of such a device can be referred to FIG. 11. Since the computing device is an aggregate, in which various elements (e.g., memory, processor, etc.) interact with each other, it may be named a 'computing system' in some cases. Also, the computing system may refer to an aggregate, in which a plurality of computing devices interact with each other.

Next, the terminal 11 may refer to a user (e.g., message sender, message receiver) side device using the message service. For example, the user can use the message service after executing a message client (e.g., message client application) installed in the terminal 11 and logging in. Therefore, the operation of the terminal 11 related to the message service may be understood as being performed by the message client. The message client may be an application implemented so that a user can conveniently use a message service, but the scope of the present disclosure is not limited thereto. If the message service is provided based on the web, the message client may mean a web browser.

A user of the terminal 11 may set (or register) an interest message through the message client. In addition, the terminal 11 may provide a notification function for an interest message to the user through the message client. The notification method may be any method as long as it is a method that the user can recognize.

In addition, the terminal 11 may provide a search function for interest messages. Specifically, the terminal 11 may provide a search result for the interest message without going through the message server 10 by storing the interest message in the local storage. In this case, since the load due to the search for the interest message is not concentrated on the message server 10 but distributed to a plurality of terminals 11, the search function for the interest message can be implemented without increasing the load on the message server 10 In this regard, it will be described in more detail later with reference to the drawings below in FIG. 2.

The functions and detailed operations of the terminal 11 will also be described in more detail later with reference to the drawings below in FIG. 2.

The terminal 11 may be implemented in various types of computing devices, such as mobile terminals (e.g., smartphones, tablets, laptops, notebooks, etc.), fixed terminals (e.g., desktops, etc.), and may be implemented in any computing device. An example of a computing device can be referred to FIG. 11.

As shown in FIG. 1, the message server 10 and the terminal 11 may communicate through a network. Here, the network can be implemented as all types of wired/wireless networks such as a local area network (LAN), a wide area network (WAN), a mobile communication network, and Wibro (Wireless Broadband Internet).

A message service providing environment according to some embodiments of the present disclosure has been briefly described so far with reference to FIG. 1. Hereinafter, a method of processing an interest message according to some embodiments of the present disclosure will be described with reference to FIG. 2 and subsequent drawings. However, in order to provide more convenience of understanding, the description will continue on the assumption that the method to be described later is performed in the environment illustrated in FIG. 1.

Figure 2:
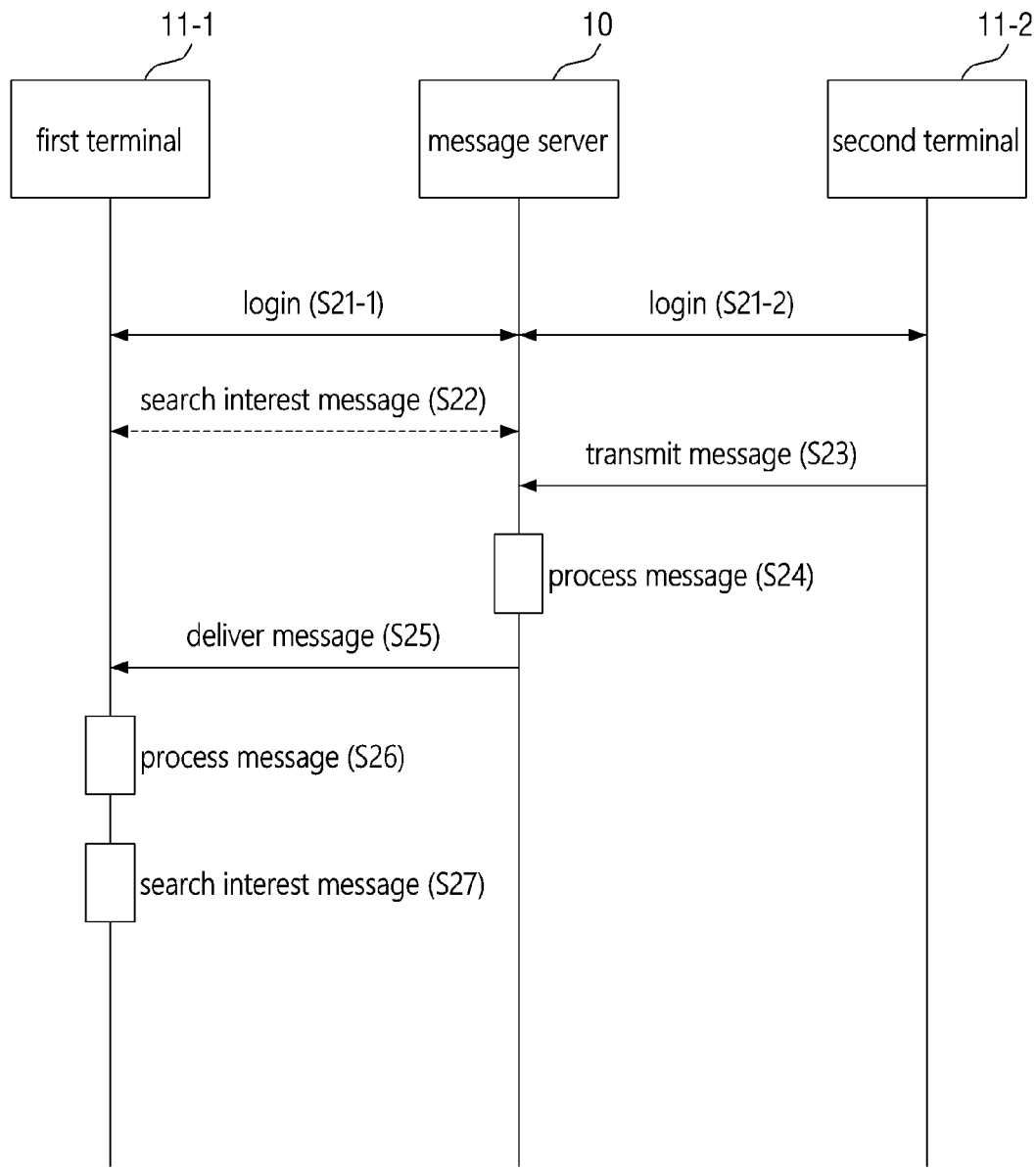
FIG. 2 is an exemplary flowchart schematically illustrating a method of processing an interest message according to some embodiments of the present disclosure.

FIG. 2 is an exemplary diagram schematically illustrating a method of processing an interest message according to some embodiments of the present disclosure. However, this is only an example embodiment for achieving the object of the present disclosure, and some steps may be added or deleted as needed. FIG. 2 assumes that the first terminal 11-1 is a terminal of a message receiver and the second terminal 11-2 is a terminal of a message sender (writer).

As shown in FIG. 2, the method according to the embodiments may start at steps S21-1 and S21-2, in which users of the first terminal 11-1 and the second terminal 11-2 log in.

For example, the user of the first terminal 11-1 may log in to the message service by executing a message client and inputting login information. The login method can be any method.

In step S21-1, as the login succeeds, the first terminal 11-1 (or message client) detects the occurrence of a login event.

For reference, although FIG. 2 illustrates that steps S21-1 and S21-2 are performed simultaneously, the two steps may be performed at different times and/or in different orders.

In step S22, the first terminal 11-1 may search for interest messages of the user through the message server 10 as needed. For example, the first terminal 11-1 may search previously occurred interest messages through the message server 10 as necessary in response to detecting the occurrence of the login event. It may be understood that this step is performed to store interest messages occurred before the user's login (i.e., interest messages occurred prior to the login event) in the local storage of the first terminal 11-1. The detailed process of this step is illustrated in FIG. 3.

Figure 3:
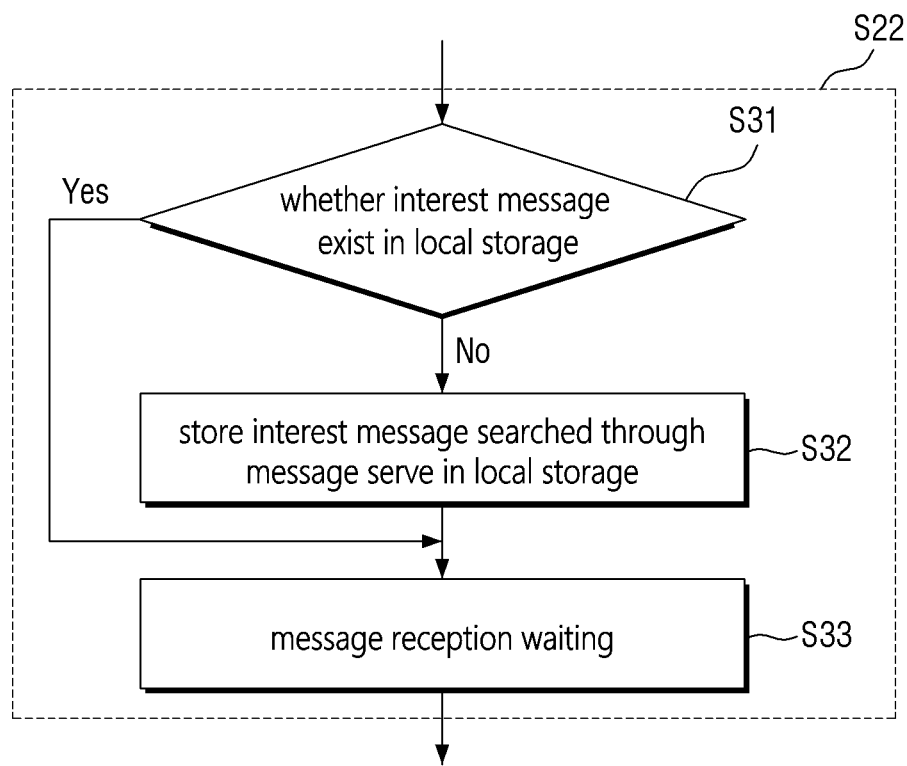
FIG. 3 is an exemplary flowchart illustrating a detailed process of the interest message search step S22 shown in FIG. 2.

As illustrated in FIG. 3, the first terminal 11-1 may search for previous interest messages through the message server 10 only when there is no interest message pre-stored in the local storage, and store the searched previous interest messages in the local storage (S31, S32). By doing so, it is possible to prevent a case, in which an interest message that is omitted exists in the local storage of the terminal 11-1. When search and storage are completed, the first terminal 11-1 may enter a message reception waiting state (S33).

For reference, when the user logs in to the message service again using the first terminal 11-1 (i.e., when a login event occurs again), since the pre-stored interest message exists in the local storage of the first terminal 11-1, the above-described step S32 may not be performed. That is, the above-described step S32 may be performed only when the user logs in to the message service using the first terminal 11-1 for the first time. Also, for this reason, even if the number of message service users increases exponentially, the load added to the message server 10 in relation to the search of the interest message may be quite insignificant.

It will be described with reference to FIG. 2 again.

In step S23, the second terminal 11-2 may transmit a message to the message server 10. For example, when the user of the second terminal 11-2 writes (inputs) a message through the message client of the second terminal 11-2 and requests transmission, the second terminal 11-2 may transmit the requested message to the message server 10.

In step S24, the message server 10 may process the received message. For example, the message server 10 may determine whether the received message corresponds to the interest message, and may perform appropriate processing based on the determination result. If the recipient (i.e., the user of the first terminal 11-1) is logged out, the message server 10 may store the corresponding message in the recipient's account (e.g., a storage space for messages to be sent to the recipient's account). The detailed process of this step is illustrated in FIG. 4.

Figure 4:
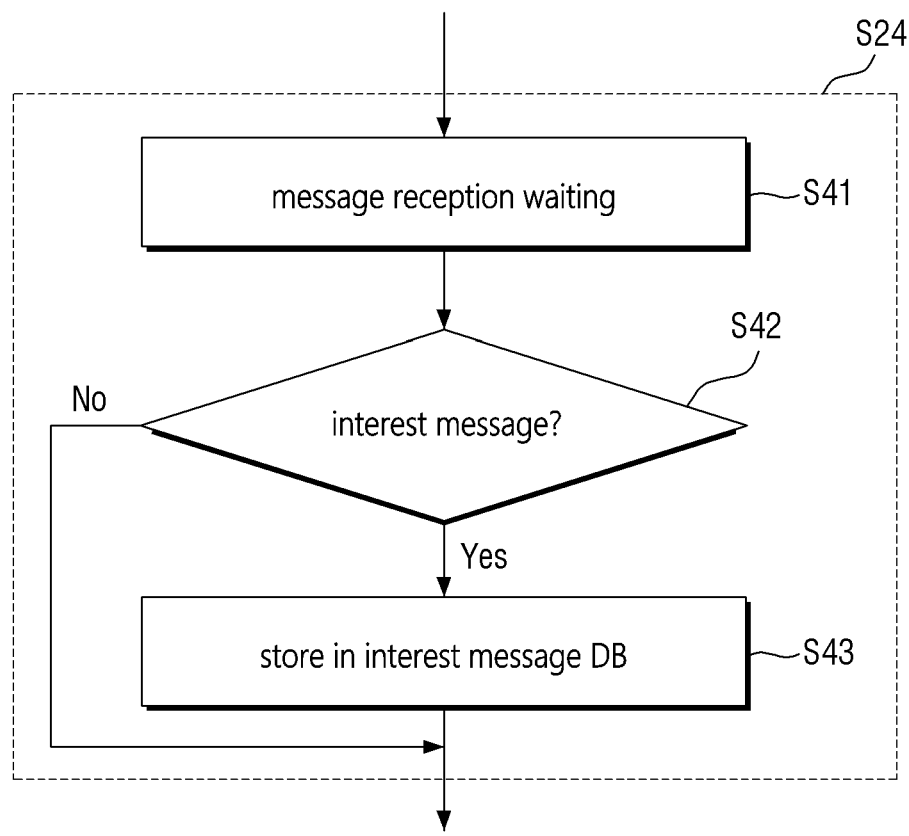
FIG. 4 is an exemplary flowchart illustrating detailed processes of the message processing step S24 of the message server side shown in FIG. 2.

As illustrated in FIG. 4, when a message is received, the message server 10 may first determine whether the corresponding message corresponds to an interest message (S41 and S42). Then, in response to determining that the message corresponds to the interest message, the message server 10 may store the received message in the interest message DB (S43). Depending on circumstances, the message server 10 may index and store received messages in various ways, and any indexing method may be used. For example, the message server 10 may index and store received messages according to a user (e.g., a sender ID, a receiver ID), a type of interest message, a message sending time, and the like. However, the scope of the present disclosure is not limited thereto.

For reference, although not shown in FIG. 4, if the received message is a general message (i.e., does not correspond to the interest message), the corresponding message may be stored in the general message DB.

It will be described with reference to FIG. 2 again.

In step S25, the message server 10 may deliver (transmit) the processed message to the receiver (i.e., the user of the first terminal 11-1). For example, if the processed message corresponds to an interest message, the message server 10 may transmit the corresponding message so that a notification is provided to the receiver.

In step S26, the first terminal 11-1 may process the received message. For example, the first terminal 11-1 may determine whether the received message corresponds to the interest message, and may perform appropriate processing (e.g., storage, provision of notification, etc.) based on the determination result. In addition, the first terminal 11-1 may also perform processing such as displaying the received message (e.g., displaying in a message window provided by a message client). The detailed process of this step is illustrated in FIG. 5.

Figure 5:
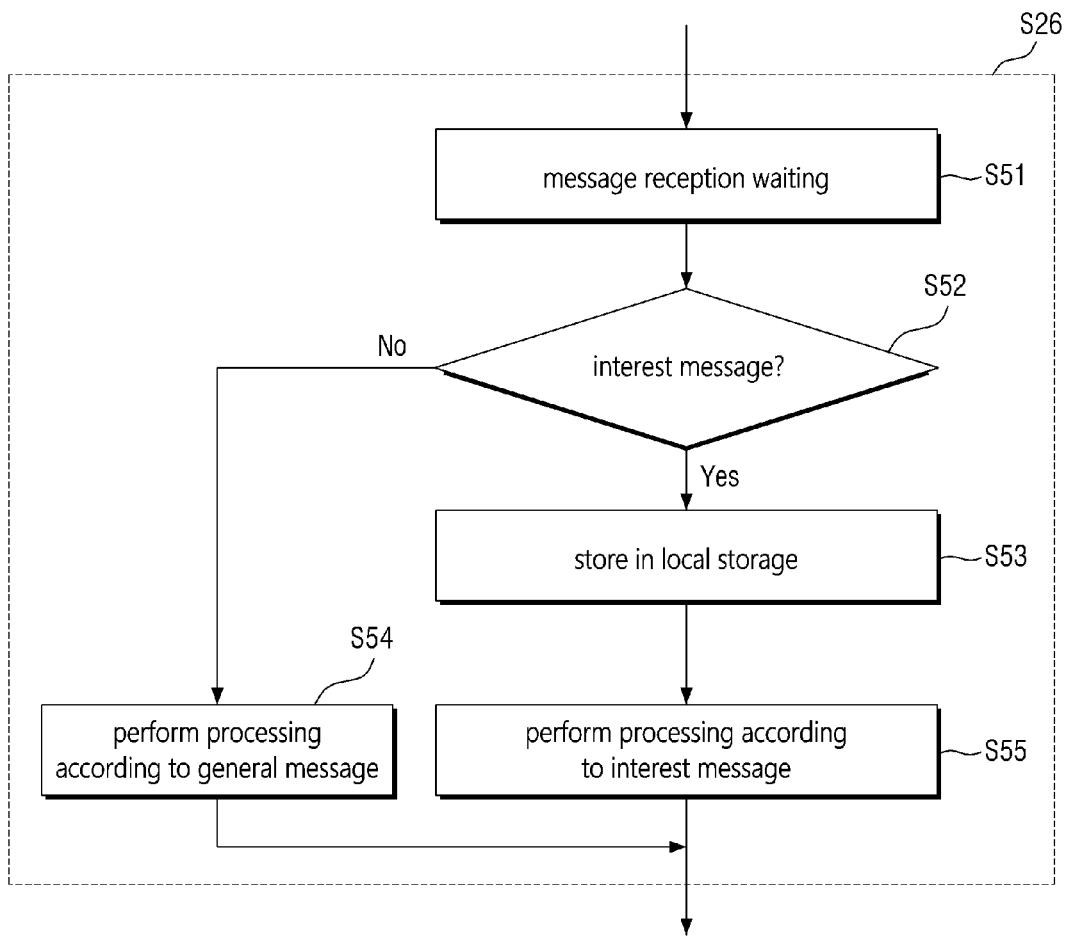
FIG. 5 is an exemplary flowchart illustrating a detailed process of message processing step S26 of the terminal side shown in FIG. 2.

As illustrated in FIG. 5, the first terminal 11-1 may store the received message in a local storage in response to determining that the received message corresponds to the interest message (S51 to S53). Then, the first terminal 11-1 may perform appropriate processing (e.g., provision of notification, displaying in a separate window, increasing the count of unread messages, etc.) on the received interest message (S55). If the received message does not correspond to the interest message, the first terminal 11-1 may perform appropriate processing according to the general message (e.g., displaying in a message window, increasing the count of unread messages in case of unread state, etc.) (S54).

It will be described with reference to FIG. 2 again.

In step S27, the first terminal 11-1 may search for an interest message according to the user's request. The detailed process of this step is illustrated in FIG. 6.

Figure 6:
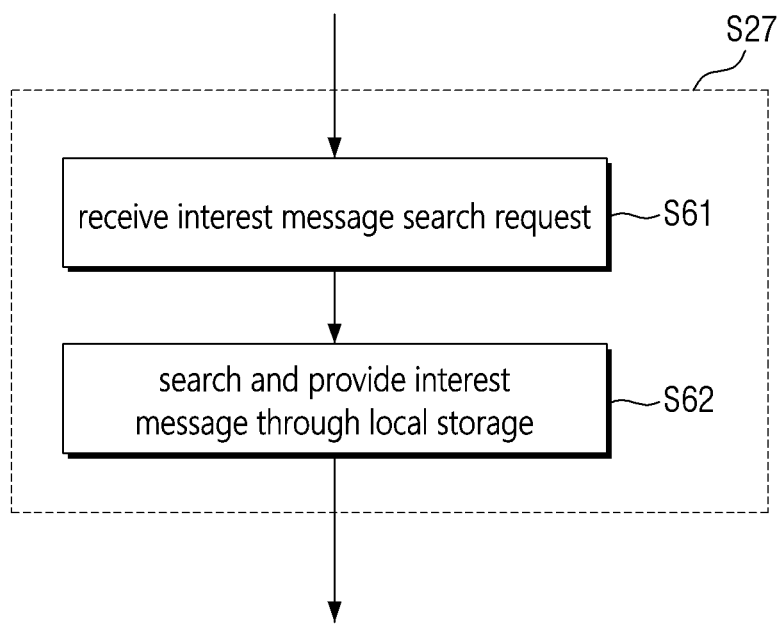
FIGS. 6 and 7 are exemplary diagrams for describing detailed processes of the interest message search step S27 shown in FIG. 2.

As illustrated in FIG. 6, the first terminal 11-1 may respond to a user's interest message search request (e.g., when the user selects a search-related button/icon displayed on a message client), and search for and provide interest messages of the corresponding user through local storage (S61, S62). That is, the first terminal 11-1 may search for and provide the interest message through its local storage instead of through the message server 10, and accordingly, a search function for the interest message can be implemented without increasing the load of the message server 10.

Figure 7:
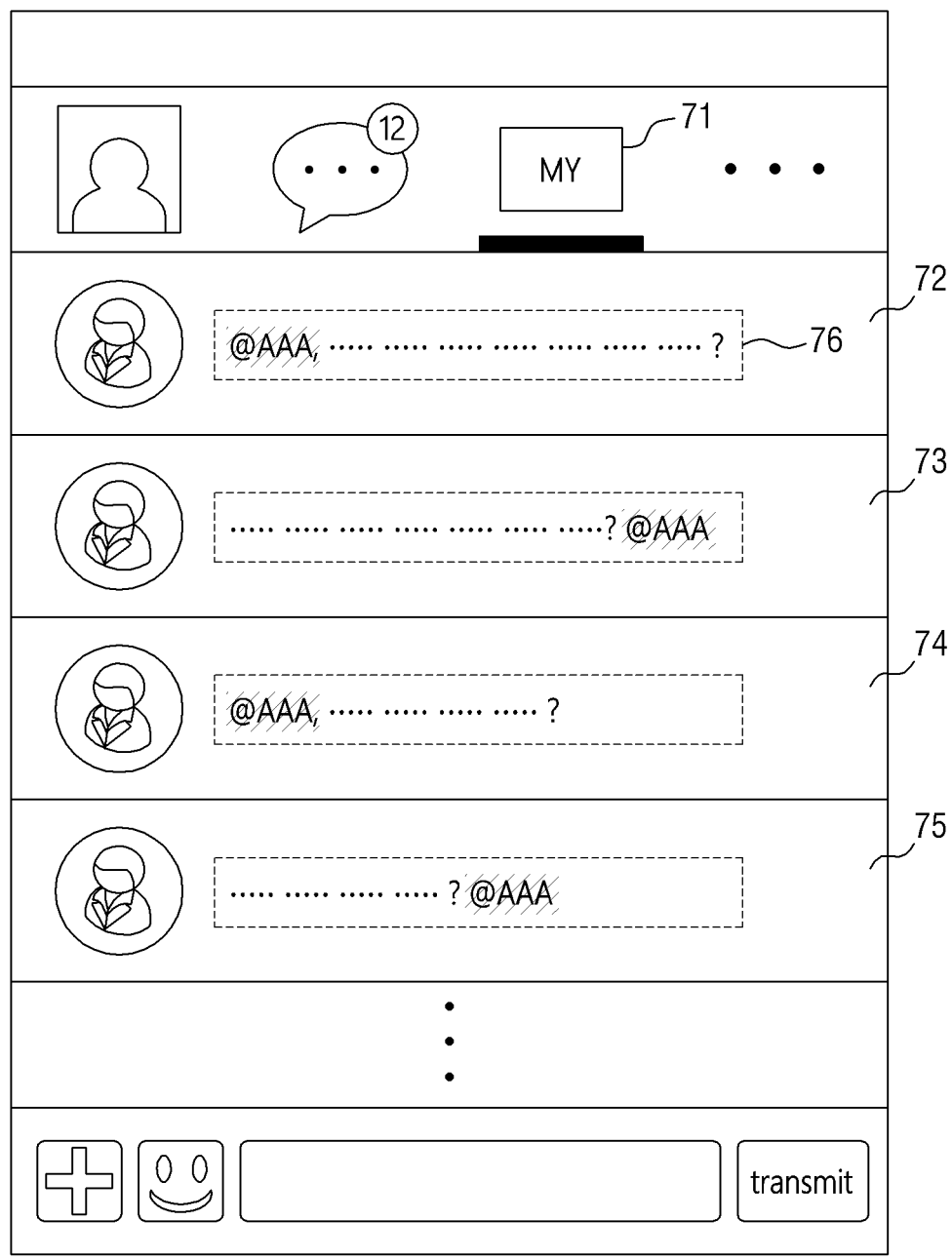

FIG. 7 illustrates an interest message search interface of a message client according to some embodiments of the present disclosure, and illustrates a case, in which the interest message is set as a message mentioning the user (refer to '@AAA'). The interface illustrated in FIG. 7 may also be understood as a screen displayed on the first terminal 11-1.

As illustrated in FIG. 7, the message client of the first terminal 11-1 may provide an interface 71 (e.g., a GUI object such as a button) for requesting a message search and an interface for displaying a search result. In addition, the first terminal 11-1 may display (provide) interest messages 72 to 75 of the corresponding user through an interface of the message client. For example, information such as the contents (e.g., 76) of the interest message (e.g., 72), sender (writer), sending time, receiving time, etc. may be displayed, but the scope of the present disclosure is not limited thereto, and the type of the displayed information can be changed.

So far, the interest message processing method according to some embodiments of the present disclosure has been described with reference to FIGS. 2 to 7. As described above, the user's interest message may be stored in the local storage provided in the user's terminal 11, and the interest message may be searched through the user's terminal 11 instead of the message server 10. Accordingly, an accurate search function for an interest message can be implemented without increasing the load of the message server 10.

Hereinafter, a method of processing an unread message according to some embodiments of the present disclosure will be described with reference to FIGS. 8 and 9.

Unread messages refer to messages in the 'unread (or unread)' state. An example of unread messages includes messages that occurred before the user logged in, messages received while logged in but the user has not yet checked, etc. However, the scope of the present disclosure is not limited thereto.

Figure 8:
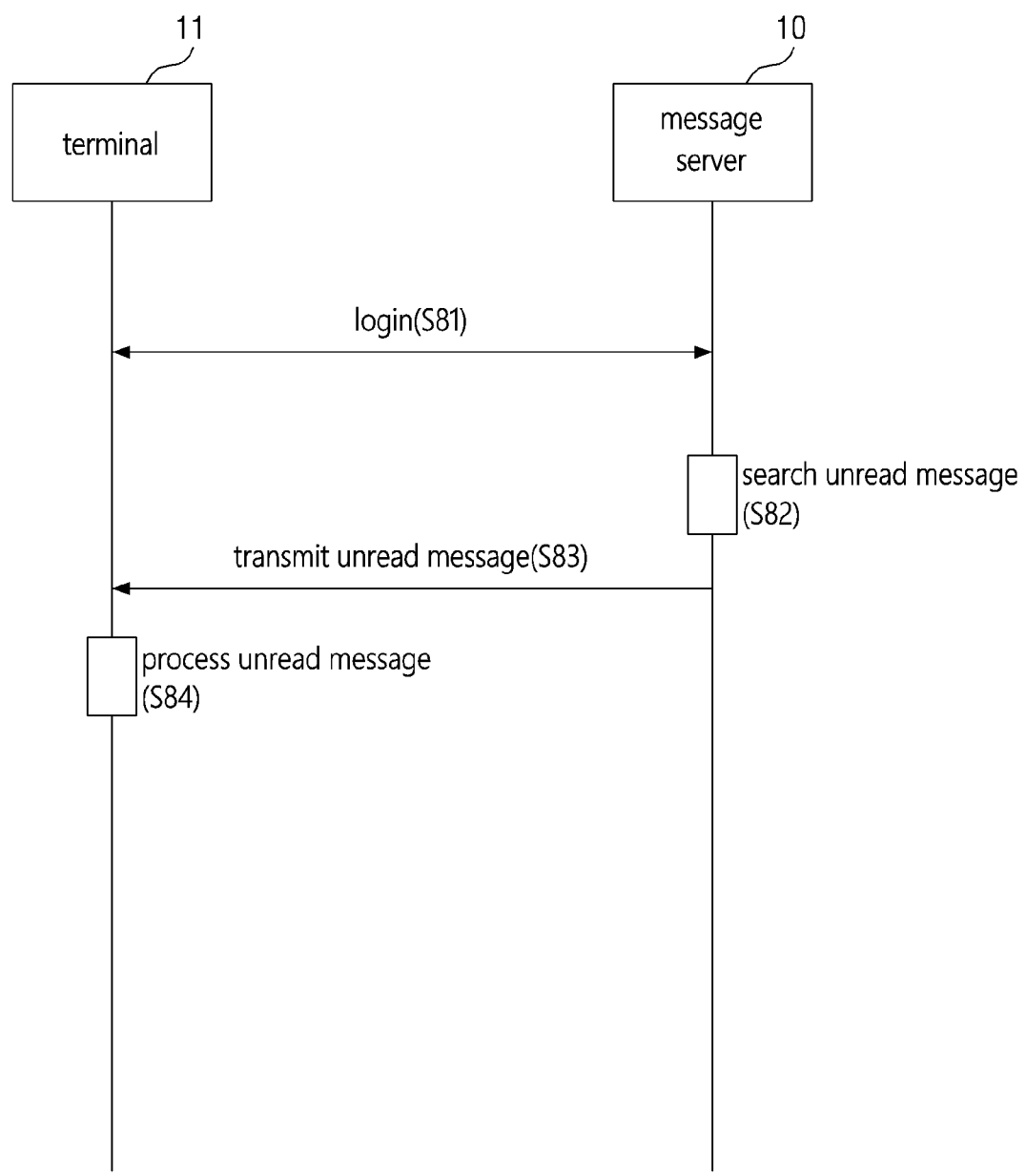
FIGS. 8 and 9 are exemplary diagrams for describing a method of processing an unread message according to some embodiments of the present disclosure.

FIG. 8 is an exemplary flowchart schematically illustrating a method of processing unread messages according to some embodiments of the present disclosure, and illustrates a case, in which an unread message occurred prior to login is received in response to a login event as an example.

As shown in FIG. 8, when a user of the terminal 11 logs in (that is, in response to a login event), the message server 10 may search for and provide unread messages for the user (S81 to S83).

Then, the terminal 11 may perform appropriate processing on the provided unread messages (S84). For example, the terminal 11 may determine whether a message corresponding to an interest message exists among unread messages and store the corresponding message in a local storage. Also, the terminal 11 may increase the unread message count. Since this process is similar to the process illustrated in FIG. 5, the description of FIG. 5 will be further referred to in relation to step S84.

Meanwhile, in some embodiments, the terminal 11 may display at least some of unread messages through a preview region (or interface) of the message client. Here, the preview region is a region where information (e.g., contents, etc.) of unread messages can be previewed, and the state of unread messages may not be changed (updated) to 'confirmed (or read)' even if displayed in the preview region. According to this embodiment, the user can roughly grasp the contents of unread messages or selectively check only necessary messages through the preview region (e.g., specific unread messages can be checked first by looking at the preview contents). Regarding this embodiment, it will be further described with reference to FIG. 9.

Figure 9:
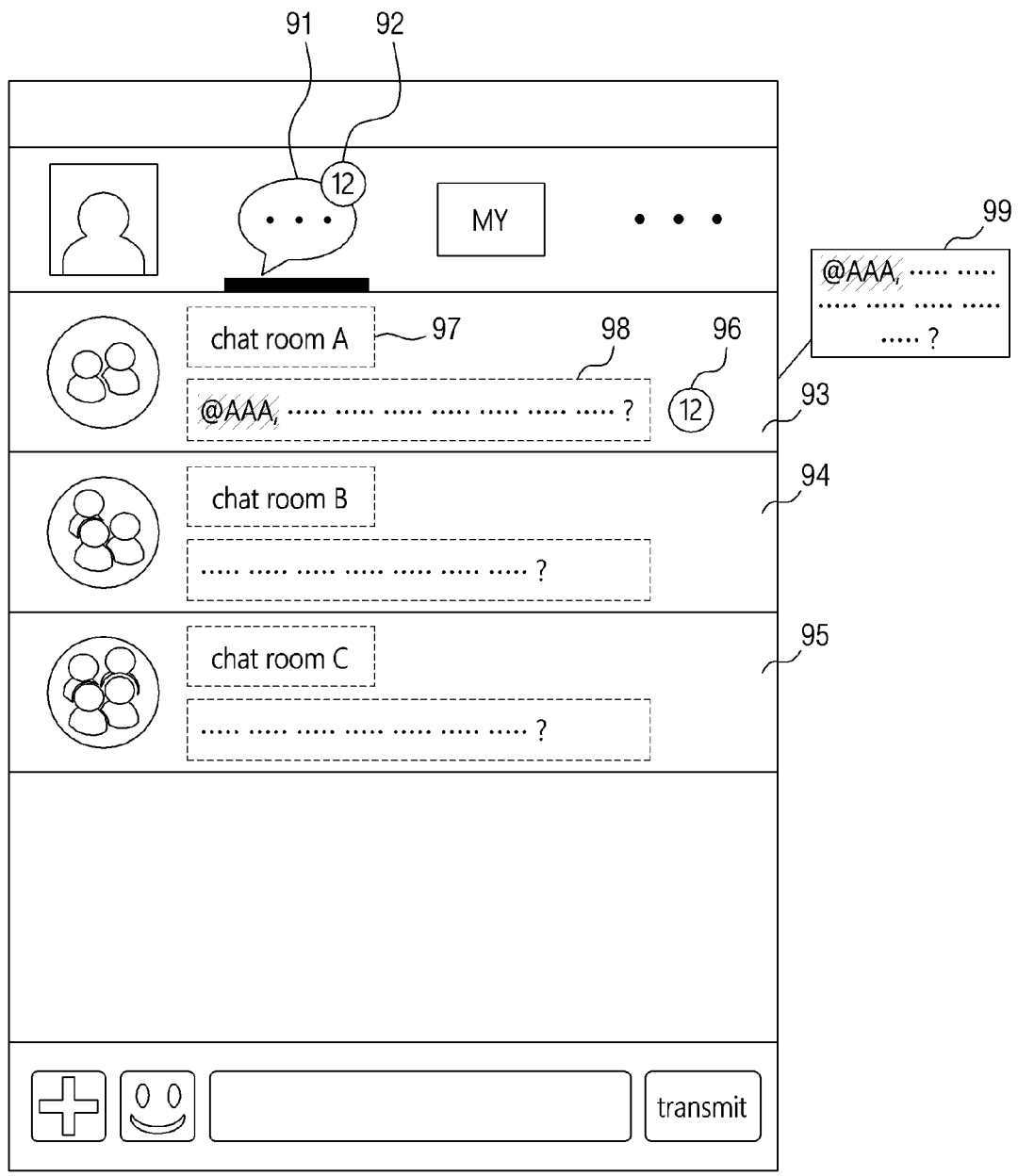

FIG. 9 illustrates a chat room (or chat channel) related interface of a message client according to some embodiments of the present disclosure. The interface illustrated in FIG. 9 may also be understood as a screen displayed on the terminal 11.

As shown in FIG. 9, the message client of the terminal 11 may provide an interface for requesting a chat room display 91 (e.g., a GUI object such as a button) and an interface for displaying the chat rooms 93 to 95. In a specific region of the provided interface, a count of unread messages (e.g., 96) for each chat room (e.g., 93) and a total unread message count 92 may be displayed. In addition, information on the corresponding chat room may be displayed for each chat room (e.g., 93) on the provided interface (see 97 and 98). Examples of such information include chat room participant information (e.g., number of participants), chat room title, chat room opening time, contents of a specific message (e.g., recent message), sending (writing) time of a specific message, and receiving time of a specific message. However, the scope of the present disclosure is not limited thereto.

In addition, the message client of the terminal 11 may provide preview regions (e.g., 98, 99) for each of the chat rooms 93 to 95. As shown, the preview regions (e.g., 98, 99) may be regions where the user can check some kind of information (e.g., message contents) even if the user does not open the message window (i.e., chat window) of the specific chat room (e.g., 93). In some cases, unlike a pop-up notification window, it may be a region continuously displayed through an interface of a message client.

According to embodiments of the present disclosure, contents of a message selected from among unread messages may be displayed in the preview region (e.g., 98, 99), and a specific method of selecting the message may be designed in various ways.

As an example, a message corresponding to an interest message among unread messages may be displayed in the preview region (e.g., 98, 99). In this case, the user can preview the content of the interest message and selectively check unread messages. For reference, FIG. 9 illustrates a case, in which an interest message (more precisely, a message mentioning the user) is displayed in the preview regions (e.g., 98, 99), as an example.

As another example, a first message corresponding to an interest message among unread messages and at least one second message related to the first message may be displayed together in the preview regions 98 and 99. In this case, the second message may be an interest message or a general message. The relevancy between the first message and the second message may be determined based on, for example, whether the senders of the messages are the same, difference in message sending (writing) time, text similarity, topic similarity, and the like. However, the scope of the present disclosure is not limited thereto. According to this example, the user can view the related messages displayed in the preview regions (e.g., 98 and 99) and grasp the topics and contexts of unread messages in advance.

In the previous example, summary information on the first message and the second message may be displayed in the preview regions (e.g., 98 and 99) depending on the case. This can be understood as considering size limitations of the preview regions (e.g., 98 and 99). The summary information may be, for example, a keyword extracted from each message, a topic derived through message analysis, and the like, but is not limited thereto.

Meanwhile, in some embodiments, the arrangement order of the chat rooms 93 to 96 may be determined based on the analysis result of the unread messages. For example, the terminal 11 may determine the arrangement order of the chat rooms 93 to 96 based on the number of unread messages, the number of interest messages among the unread messages, the sending (writing) time of the interest messages, etc. (e.g., placing a chat room with a large number of messages at the top, etc.). Alternatively, the terminal 11 may derive a topic for each chat room by analyzing the contents of the unread messages or interest messages, and determine the arrangement order of the chat rooms 93 to 96 based on the importance of the derived topic.

So far, the method of processing an unread message according to some embodiments of the present disclosure has been described with reference to FIGS. 8 and 9.

Meanwhile, in some cases, a problem, in which the interest message is omitted in the local storage of the terminal 11, may occur. For example, the omission problem may occur due to a network/communication error, a local storage error, or the like, and this omission problem may also occur when a user uses a message service through alternately changing several terminals 11. Hereinafter, a method of preventing this omission problem will be described with reference to FIG. 10.

Figure 10:
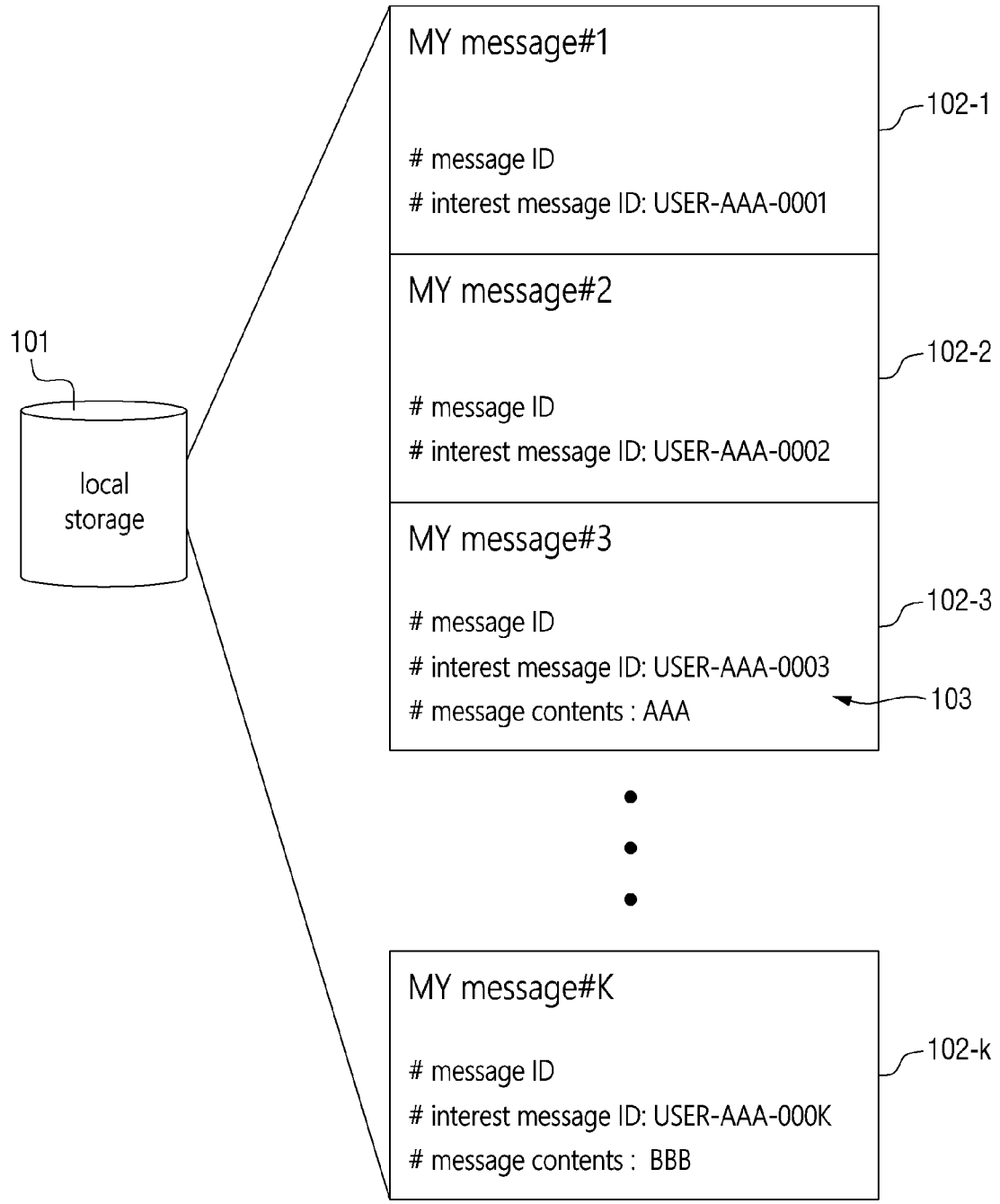
FIG. 10 is an exemplary diagram for describing a method of preventing omission of an interest message according to some embodiments of the present disclosure.

FIG. 10 is an exemplary diagram for describing a method of preventing omission of an interest message according to some embodiments of the present disclosure.

In this embodiment, a sequence number may be assigned to each of the interest messages 102-1 to 102-k. FIG. 10 illustrates that the sequence number (e.g., 103) of interest messages (102-1 to 102-k) is used as an 'ID,' and the sequence number (e.g., 103) of interest messages 102-1 to 102-k is composed of a combination of a user ID (e.g., 'USER-AAA') and a sequence number (e.g., '0001') in a predefined format.

In the above case, the terminal 11 may periodically or aperiodically (e.g., when the interest message is stored in the local storage 101) check sequence numbers of interest messages 102-1 to 102-k stored in the local storage 101 to determine whether an omitted interest message exists. And, in response to determining that it exists, the terminal 11 may request and store only the interest message that is omitted from the message server 10. By doing so, the problem of omission of the interest message can be easily solved.

On the other hand, according to some other embodiments, in response to the occurrence of a login event for a specific user, the message server 10 may provide information about an interest message of the specific user to the terminal 11 of the specific user (e.g., ID of interest message, number, etc.). Then, the terminal 11 may determine whether the omitted interest message exists in the local storage based on the provided information.

According to some other embodiments, the terminal 11 may analyze previous interest messages stored in the local storage, extract a pattern of occurrence of the interest message of the corresponding user, and use the extracted occurrence pattern to predict whether an omitted interest message exists in the local storage. For example, the terminal 11 may extract an occurrence pattern for an interest message based on a sender, an occurrence interval, and the number of occurrences of the interest message. In addition, the terminal 11 may predict that there is an omitted interest message when the occurrence pattern of the current interest messages stored in the local storage is different from the extracted occurrence pattern by more than a reference value.

The method of preventing the omission of the interest message has been described with reference to FIG. 10 so far. Hereinafter, referring to FIG. 11, an exemplary computing device 110 capable of implementing the terminal 11 and/or the message server 10 according to some embodiments of the present disclosure will be described.

FIG. 11 is an exemplary hardware configuration diagram illustrating computing device 110.

As shown in FIG. 11, the computing device 110 may comprise one or more processors 111, a bus 113, a communication interface 114, a memory 112 for loading a computer program executed by the processor 111 and a storage 115 for storing the computer program 116. However, only components related to the embodiment of the present disclosure are shown in FIG. 11. Accordingly, those of ordinary skill in the art to which this disclosure belongs may know that other general-purpose components may be further included in addition to the components shown in FIG. 11. That is, the computing device 110 may further include various components other than the components shown in FIG. 11. Also, in some cases, the computing device 110 may be configured in a form, in which some of the components shown in FIG. 11 are omitted. Hereinafter, each component of the computing device 110 will be described.

The processor 111 may control overall operations of each component of the computing device 110. The processor 111 may include at least one of a Central Processing Unit (CPU), a Micro Processor Unit (MPU), a Micro Controller Unit (MCU), a Graphic Processing Unit (GPU), or any type of processor well known in the art. Also, the processor 111 may perform an operation for at least one application or program for executing an operation/method according to embodiments of the present disclosure. The computing device 110 may include one or more processors.

Next, the memory 112 may store various data, commands and/or information. The memory 112 may load computer program 116 from storage 115 to execute operations/methods according to embodiments of the present disclosure. The memory 112 may be implemented as a volatile memory such as RAM, but the technical scope of the present disclosure is not limited thereto.

Next, the bus 113 may provide a communication function between components of the computing device 110. The bus 113 may be implemented as various types of buses such as an address bus, a data bus, and a control bus.

Next, the communication interface 114 may support wired and wireless internet communication of the computing device 110. Also, the communication interface 114 may support various communication methods other than internet communication. To this end, the communication interface 114 may include a communication module well known in the art of the present disclosure.

Next, the storage 115 may non-temporarily store one or more computer programs 116. The storage 115 may include a non-volatile memory such as read only memory (ROM), erasable programmable ROM (EPROM), electrically erasable programmable ROM (EEPROM), and flash memory, a hard disk, a removable disk, or any type of computer-readable recording medium well known in the art, to which the present disclosure pertains.

The computer program 116 may include one or more instructions that when loaded into memory 112 cause processor 111 to perform operations/methods in accordance with various embodiments of the present disclosure. That is, the processor 111 may perform operations/methods according to various embodiments of the present disclosure by executing one or more loaded instructions.

For example, the computer program 116 may comprise instructions for performing an operation of receiving a message from the message server 10 after a login event for the user occurs, an operation of storing, in response to determining that the received message corresponds to an interest message of the user, the received message in the local storage (e.g., 115), an operation of receiving a search request for an interest message of the user, and an operation of searching and providing, in response to the search request, the interest message of the user through the local storage (e.g., 115). In this case, the terminal 11 according to some embodiments of the present disclosure may be implemented through the computing device 110.

As another example, the computer program 116 may comprises instructions for performing an operation of receiving a request for sending a message from the terminal (e.g., 11-2) of the message sender, an operation of storing, in response to determining that the received message is an interest message, the interest message in an interest message DB and an operation of transmitting the received message to the message receiver's terminal (e.g., 11-1). In this case, the message server 10 according to some embodiments of the present disclosure may be implemented through the computing device 110.

An exemplary computing device 110 capable of implementing the terminal 11 and/or the message server 10 according to some embodiments of the present disclosure has been described with reference to FIG. 11 so far.

So far, a variety of embodiments of the present disclosure and the effects according to embodiments thereof have been mentioned with reference to FIGS. 1 to 11. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation.

What is claimed is:

1. A method performed in a terminal for processing an interest message comprising:
   receiving a message from a message server after a login event for a user of the terminal occurs, wherein the login event is related to a message service provided by the message server;
   storing, in response to determining that the received message corresponds to an interest message of the user, the received message in a local storage of the terminal;
   receiving a search request for the interest message of the user; and
   searching and providing the interest message of the user through the local storage of the terminal in response to the search request,
   wherein the method further comprises:
   receiving a plurality of unread messages from the message server;
   storing at least one message, including a first message, corresponding to the interest message of the user among the plurality of unread messages in the local storage;
   selecting the first message among the plurality of unread messages, and
   displaying contents of the first message in a preview region located on a screen of the terminal,
   wherein the method further comprises:
   detecting occurrence of the login event;
   searching, in response to the detecting, interest messages of the user occurred before the login event through the message server; and
   storing the searched interest messages in the local storage of the terminal, and
   wherein the searching the interest messages of the user comprises:
   determining, in response to the detecting, whether a pre-stored interest message exists in the local storage; and
   searching the interest messages of the user only when it is determined that the pre-stored interest message does not exist.

2. The method of claim 1, wherein the interest message comprises at least one of:
   a message, in which the user is mentioned;
   a message included in a thread of the message in which the user is mentioned; or
   a response message to a message written by the user.

3. The method of claim 1, wherein the interest message includes a message related to a user of interest or a keyword of interest.

4. The method of claim 1, wherein, after the login event, searching the interest messages of the user is not performed if a login event for the user occurs again in the terminal.

5. The method of claim 1, wherein a state of the first message is not changed to a confirmed state even if the contents of the first message is displayed in the preview region.

6. The method of claim 5, wherein contents of a second message related to the first message among the plurality of unread messages is further displayed in the preview region,
   wherein the second message does not correspond to the interest message of the user.

7. A terminal comprising:
   one or more processors;
   a memory configured to store one or more instructions;
   a local storage; and
   a communication interface configured to communicate with a message server;
   wherein the one or more processors are configured to execute the stored one or more instructions to perform:
   receiving a message from the message server after a login event for a user of the terminal occurs, wherein the login event is related to a message service provided by the message server;
   storing, in response to determining that the received message corresponds to an interest message of the user, the received message in the local storage;
   receiving a search request for the interest message of the user; and
   searching and providing the interest message of the user through the local storage in response to the search request,
   wherein the one or more processors are configured to execute the stored one or more instructions to further perform:
   receiving a plurality of unread messages from the message server;

storing at least one message, including a first message, corresponding to the interest message of the user among the plurality of unread messages in the local storage; and selecting the first message among the plurality of unread messages, and displaying contents of the first message in a preview region located on a screen of the terminal, wherein the one or more processors are configured to execute the stored one or more instructions to further perform:

detecting occurrence of the login event;

searching, in response to the detecting, interest messages of the user occurred before the login event through the message server; and storing the searched interest messages in the local storage of the terminal, and wherein the searching the interest messages of the user comprises:

determining, in response to the detecting, whether a pre-stored interest message exists in the local storage; and searching the interest messages of the user only when it is determined that the pre-stored interest message does not exist.

8. A non-transitory computer-readable recording medium storing computer program executable by at least one processor to perform:

receiving a message from a message server after a login event for a user of a terminal occurs, wherein the login event is related to a message service provided by the message server;

storing, in response to determining that the received message corresponds to an interest message of the user, the received message in a local storage of the terminal;

receiving a search request for the interest message of the user; and searching and providing the interest message of the user through the local storage of the terminal in response to the search request, wherein the computer program is executable by the at least one processor to further perform:

receiving a plurality of unread messages from the message server;

storing at least one message, including a first message, corresponding to the interest message of the user among the plurality of unread messages in the local storage; and selecting the first message among the plurality of unread messages, and displaying contents of the first message in a preview region located on a screen of the terminal, wherein the computer program is executable by the at least one processor to further perform:

detecting occurrence of the login event;

searching, in response to the detecting, interest messages of the user occurred before the login event through the message server; and storing the searched interest messages in the local storage of the terminal, and wherein the searching the interest messages of the user comprises:

determining, in response to the detecting, whether a pre-stored interest message exists in the local storage; and searching the interest messages of the user only when it is determined that the pre-stored interest message does not exist.

\* \* \* \* \*